(12) United States Patent
Yuan et al.

(10) Patent No.: US 12,151,990 B2
(45) Date of Patent: Nov. 26, 2024

(54) ORGANIC NUTRIENT TYPE POTASSIUM SULFATE DISSOLUTION ACCELERATOR, PREPARATION THEREFOR AND USE THEREOF

(71) Applicant: INSTITUTE OF AGRICULTURAL RESOURCES AND REGIONAL PLANNING, CHINESE ACADEMY OF AGRICULTURAL SCIENCES, Beijing (CN)

(72) Inventors: Liang Yuan, Beijing (CN); Bingqiang Zhao, Beijing (CN); Wei Wang, Shandong (CN); Yanting Li, Beijing (CN); Zhian Lin, Beijing (CN); Shuiqin Zhang, Beijing (CN)

(73) Assignee: INSTITUTE OF AGRICULTURAL RESOURCES AND REGIONAL PLANNING, CHINESE ACADEMY OF AGRICULTURAL SCIENCES, Beijing (CN)

( * ) Notice: Subject to any disclaimer, the term of this patent is extended or adjusted under 35 U.S.C. 154(b) by 860 days.

(21) Appl. No.: 17/292,326

(22) PCT Filed: Nov. 4, 2019

(86) PCT No.: PCT/CN2019/115376
§ 371 (c)(1),
(2) Date: May 7, 2021

(87) PCT Pub. No.: WO2020/093978
PCT Pub. Date: May 14, 2020

(65) Prior Publication Data
US 2021/0395160 A1 Dec. 23, 2021

(30) Foreign Application Priority Data
Nov. 9, 2018 (CN) .......................... 201811328620.2

(51) Int. Cl.
*C05G 5/23* (2020.01)
*C05D 1/00* (2006.01)
*C05G 3/40* (2020.01)

(52) U.S. Cl.
CPC ............... *C05G 3/44* (2020.02); *C05D 1/005* (2013.01); *C05G 5/23* (2020.02)

(58) Field of Classification Search
CPC ... C05G 3/44; C05G 5/23; C05G 3/00; C05D 1/005; C05D 1/02; C05C 11/00; C05F 11/10
See application file for complete search history.

(56) References Cited

FOREIGN PATENT DOCUMENTS

| CN | 1944349 A | | 4/2007 |
|---|---|---|---|
| CN | 103771910 A | | 5/2014 |
| CN | 106176270 A | * | 12/2016 |
| CN | 108440146 A | | 8/2018 |
| CN | 109232098 A | | 1/2019 |

OTHER PUBLICATIONS

International Application No. PCT/CN2019/115376, International Search Report mailed Feb. 7, 2020, 2 pages.

\* cited by examiner

*Primary Examiner* — Jennifer A Smith
(74) *Attorney, Agent, or Firm* — COZEN O'CONNOR

(57) ABSTRACT

The present invention relates to an organic nutrient-based dissolution accelerator for potassium sulfate and a preparation method therefor and the use thereof. The organic nutrient-based dissolution accelerator for potassium sulfate of the present invention consists of an organic acid mixture solution, tyrosine, leucine, threonine, alcohol amine, and the like. The organic nutrient-based dissolution accelerator for potassium sulfate of the present invention can not only substantially improve the dissolution speed of potassium sulfate by 6-120 times, but also provides organic nutrition for crops to achieve a synergy with inorganic nutrition to further improve the nutritional efficiency of potassium and sulfur elements.

17 Claims, No Drawings ic # ORGANIC NUTRIENT TYPE POTASSIUM SULFATE DISSOLUTION ACCELERATOR, PREPARATION THEREFOR AND USE THEREOF

TECHNICAL FIELD

The present invention belongs to the technical field of fertilizer production. More specifically, the present invention relates to an organic nutrient-based dissolution accelerator for potassium sulfate, to a preparation method of the organic nutrient-based dissolution accelerator for potassium sulfate, and to the use of the organic nutrient-based dissolution accelerator for potassium sulfate.

BACKGROUND

Potassium sulfate is a salt composed of sulfate ions and potassium ions, and commonly is colorless or white crystals, granules or powder. Potassium sulfate is an important type of potash fertilizer in China, and also an important raw material for the production of compound fertilizers and water-soluble fertilizers. It has the following advantages: 1. Potassium sulfate is especially suitable for chlorine-sensitive crops such as tobacco, citrus, grape, potato, etc.; 2. The sulfur-deficiency area of the soil in China accounts for 40% of the total cultivated area, and potassium sulfate is needed; 3. Potassium sulfate, as a physiologically acidic fertilizer, can improve the saline soil and provide a good environment for the growth of crop roots.

Although potassium sulfate is a salt of strong acid and strong base, it dissolves very slowly in water. Sulfate easily reacts with calcium ions to form precipitates, which seriously affects its fertilizer efficiency and brings inconvenience to fertilizer application, especially water-soluble fertilizer application. In order to accelerate its dissolution, shaking (24 hours) and heating methods are often adopted, which not only increases time cost, labor cost, and energy cost during the fertilization process, but also makes it difficult to apply the fertilizer in a wide range. Some organic substances, such as organic acid, wood vinegar/bamboo vinegar, amino acids, etc., after treatment, can be absorbed by crops as organic nutrients, promote crop growth, and improve the ability of the crop to absorb, transport and utilize nutrients. Such organic substances can also accelerate the dissolution of potassium sulfate by adjusting the pH and chelating the secondary and trace elements, etc., achieving a synergy of organic nutrients with potassium and sulfur nutrients.

CN103771910A discloses "Method for producing a fast-dissolving potassium sulfate", comprising the following steps: (1) preparing a spraying aid by formulating an inorganic acid, acid anhydride or acidic inorganic salt into an aqueous solution; (2) spraying the prepared aid onto the surface of potassium sulfate; (3) spraying an aqueous solution of surfactant onto the surface of potassium sulfate after spraying the aid; (4) drying the wet potassium sulfate onto which the aid and the aqueous solution of surfactant has been sprayed; and (5) crushing the potassium sulfate product, and packaging to obtain a finished product. The processing technology is simple, and a fast-dissolving potassium sulfate product can be obtained by spraying a small amount of aid to modify the surface properties of potassium sulfate without changing the original potassium sulfate production process, and the obtained product overcomes the defect that potassium sulfate is caked due to moisture absorption during storage. The obtained product can be rapidly dispersed and dissolved in water, and meanwhile, the problem of drip hole blocking in the process of applying the water-soluble fertilizer is solved.

CONTENT OF THE INVENTION

Technical Problems to be Solved

It is an object of the present invention to provide an organic nutrient-based dissolution accelerator for potassium sulfate.

It is another object of the present invention to provide a preparation method of the organic nutrient-based dissolution accelerator for potassium sulfate.

It is still another object of the present invention to provide the use of the organic nutrient-based dissolution accelerator for potassium sulfate.

Technical Solution

The present invention is achieved by the following technical solution.

The present invention relates to an organic nutrient-based dissolution accelerator for potassium sulfate.

The organic nutrient-based dissolution accelerator for potassium sulfate includes the following composition in parts by weight:

| | |
|---|---|
| tyrosine 1-5 parts; | leucine 1-5 parts; |
| threonine 1-5 parts; | glycerol 2-5 parts; |
| alcohol amine 5-20 parts; | water 20-70 parts; |
| organic acid mixture solution | 20-40 parts by weight. |

According to another preferred embodiment of the present invention, the organic nutrient-based dissolution accelerator for potassium sulfate includes the following composition in parts by weight:

| | |
|---|---|
| tyrosine 1.8-4.2 parts; | leucine 1.8-4.2 parts; |
| threonine 1.8-4.2 parts; | glycerol 2.5-4.5 parts; |
| alcohol amine 8-16 parts; | water 35-55 parts; |
| organic acid mixture solution | 26-34 parts by weight. |

According to another preferred embodiment of the present invention, the alcohol amine is one or more selected from monoethanolamine, diethanolamine, triethanolamine and N-methyldiethanolamine.

According to another preferred embodiment of the present invention, the organic acid mixture solution consists of 20 parts by weight of glacial acetic acid, 2-5 parts by weight of salicylic acid, 1-3 parts by weight of ethylenediaminetetraacetic acid and 72-77 parts by weight of wood vinegar or bamboo vinegar.

According to another preferred embodiment of the present invention, the organic acid mixture solution consists of 20 parts by weight of glacial acetic acid, 2.8-4.2 parts by weight of salicylic acid, 1.6-2.4 parts by weight of ethylenediaminetetraacetic acid and 74-75 parts by weight of wood vinegar or bamboo vinegar.

The present invention also relates to a preparation method of the organic nutrient-based dissolution accelerator for potassium sulfate.

The preparation method comprises the following steps:
A. Preparation of the Organic Acid Mixture Solution 20 parts by weight of glacial acetic acid, 2-5 parts by weight of salicylic acid and 1-3 parts by weight of ethylenediaminetetraacetic acid are added to 72-77 parts by weight of wood vinegar or bamboo vinegar, homogeneously mixed, and then heated to a temperature of 50-80° C., at which temperature the mixture is stirred until these organic acids are completely dissolved, and then cooled to obtain the organic acid mixture solution;

B. Preparation of the Organic Nutrient-Based Dissolution Accelerator for Potassium Sulfate 20-40 parts by weight of the organic acid mixture solution obtained in step A, 1-5 parts by weight of tyrosine, 1-5 parts by weight of leucine, 1-5 parts by weight of threonine and 2-5 parts by weight of glycerol are added to 20-70 parts by weight of water, and dissolved by stirring; then, 5-20 parts by weight of alcohol amine are added, dissolved by stirring, and cooled to obtain the organic nutrient-based dissolution accelerator for potassium sulfate.

The present invention also relates to the use of the stated organic nutrient-based dissolution accelerator for potassium sulfate or the organic nutrient-based dissolution accelerator for potassium sulfate prepared by the above method in dissolving potassium sulfate with water.

According to another preferred embodiment of the present invention, the steps of dissolving potassium sulfate with water are as follows:

Firstly, the water temperature is adjusted to 5-25° C.; then the organic nutrient-based dissolution accelerator for potassium sulfate or the organic nutrient-based dissolution accelerator for potassium sulfate prepared by the above method is added to the water, followed by the addition of potassium sulfate, wherein the weight ratio of potassium sulfate to water is (0.5-1.2):10.0, and the weight ratio of the organic nutrient-based dissolution accelerator for potassium sulfate to potassium sulfate is (0.05-1.0):1; the mixture is homogeneously mixed by stirring, which allows potassium sulfate to be completely dissolved in water within 0.5-10.0 min.

According to another preferred embodiment of the present invention, the particle size of potassium sulfate is 60-150 meshes.

According to another preferred embodiment of the present invention, the stirring speed of the stirring is 80-200 rpm.

The present invention will be described hereinbelow in more detail.

The invention relates to an organic nutrient-based dissolution accelerator for potassium sulfate.

The organic nutrient-based dissolution accelerator for potassium sulfate has the following composition in parts by weight:

| | |
|---|---|
| tyrosine 1-5 parts; | leucine 1-5 parts; |
| threonine 1-5 parts; | glycerol 2-5 parts; |
| alcohol amine 5-20 parts; | water 20-70 parts; |
| organic acid mixture solution | 20-40 parts by weight. |

The main role of tyrosine in the potassium sulfate dissolution accelerator of the present invention is to provide organic nutrition, chelate metal ions such as calcium ions in water, and reduce precipitation. The tyrosine used in the present invention is a commercially available product, for example, a product sold under the trade name L-tyrosine by Jiangsu Baiyao Biotechnology Company.

The main role of leucine in the potassium sulfate dissolution accelerator of the present invention is to provide organic nutrition and chelate metal ions. The leucine used in the present invention is a commercially available product, for example, a product sold under the trade name L-leucine by Wuhan Yuancheng Gongchuang Technology Co., Ltd.

The main role of threonine in the potassium sulfate dissolution accelerator of the present invention is to provide organic nutrition and chelate metal ions. The threonine used in the present invention is a commercially available product, for example, a product sold under the trade name L-threonine by Xi'an Dafengshou Biotechnology Co., Ltd.

The main role of glycerol in the potassium sulfate dissolution accelerator of the present invention is to improve the stability of the potassium sulfate solution. The glycerol used in the present invention is a commercially available product, for example, a product sold under the trade name industrial glycerol by Jinan Nanhua Jidi Environmental Protection Technology Co., Ltd.

The main role of the alcohol amine in the potassium sulfate dissolution accelerator of the present invention is to adjust the pH of the potassium sulfate dissolution accelerator of the present invention, chelate trace elements, and enhance the low temperature resistance of the solution. According to the present invention, the alcohol amine is one or more selected from monoethanolamine, diethanolamine, triethanolamine and N-methyldiethanolamine. The alcohol amine used in the present invention is a commercially available product, for example, a product sold under the trade name monoethanolamine (MEA) by Shanghai Minchen Chemical Co., Ltd., or a product sold under the trade name N-methyldiethanolamine (MDEA) by Zouping County Guoan Chemical Co., Ltd.

The main role of the organic acid mixture solution in the potassium sulfate dissolution accelerator of the present invention is to accelerate the dissolution of potassium sulfate. It consists of 20 parts by weight of glacial acetic acid, 2-5 parts by weight of salicylic acid, 1-3 parts by weight of ethylenediaminetetraacetic acid and 72-77 parts by weight of wood vinegar or bamboo vinegar. The wood vinegar used in the present invention is a commercially available product, for example, a product sold under the trade name wood vinegar by Dongying Runyi Biotechnology Co., Ltd., and the bamboo vinegar used in the present invention is a commercially available product, for example, a product sold under the trade name bamboo vinegar by Zhengzhou Yinong Biotechnology Co., Ltd.; other components are also commercially available products.

Preferably, the organic acid mixture solution consists of 20 parts by weight of glacial acetic acid, 2.8-4.2 parts by weight of salicylic acid, 1.6-2.4 parts by weight of ethylenediaminetetraacetic acid and 74-75 parts by weight of wood vinegar or bamboo vinegar. In the present invention, when the contents of the other components are within the stated ranges, if the content of tyrosine is less than 1 part by weight, its effects on providing organic nutrition and chelating metal ions is limited; if the content of tyrosine is greater than 5 parts by weight, it will increase unnecessary costs and may make tyrosine precipitate. Therefore, it is reasonable that the content of tyrosine is 1-5 parts by weight.

Similarly, when the contents of other components are within the stated ranges, if the content of leucine is less than 1 part by weight, the organic nutrition effect is not obvious; if the content of leucine is greater than 5 parts by weight, leucine precipitation occurs. Therefore, it is appropriate that the content of leucine is 1-5 parts by weight.

When the contents of other components are within the stated ranges, if the content of threonine is less than 1 part by weight, the organic nutrition effect is not significant; if the content of threonine is greater than 5 parts by weight, threonine precipitation occurs. Therefore, it is appropriate that the content of threonine is 1-5 parts by weight.

When the contents of other components are within the stated ranges, if the content of glycerol is less than 2 parts by weight, the effect on improving the stability of the solution is not significant; if the content of glycerol is greater than 5 parts by weight, the solubility of amino acids will be affected. Therefore, it is feasible that the content of glycerin is 2-5 parts by weight.

When the contents of other components are within the stated ranges, if the content of the mixed organic acid liquid is less than 20 parts by weight, the effect on accelerating the dissolution of potassium sulfate is not desirable; if the content of the mixed organic acid liquid is greater than 40 parts by weight, the improvement of the dissolution rate is not significant, resulting in an increase in cost. Therefore, it is appropriate that the content of the mixed organic acid liquid is 20-40 parts by weight.

When the contents of other components are within the stated ranges, if the content of the alcohol amine is less than 5 parts by weight, the effect on improving the solution buffering performance is limited; if the content of the alcohol amine is greater than 20 parts by weight, the effect of the dissolution accelerator is affected due to the increase of pH. Therefore, it is appropriate that the content of the alcohol amine is 5-20 parts by weight.

Preferably, the organic nutrient-based dissolution accelerator for potassium sulfate has the following composition in parts by weight:

| | |
|---|---|
| tyrosine 1.8-4.2 parts; | leucine 1.8-4.2 parts; |
| threonine 1.8-4.2 parts; | glycerol 2.5-4.5 parts; |
| alcohol amine 8-16 parts; | water 35-55 parts; |
| organic acid mixture solution | 26-34 parts by weight. |

The present invention also relates to a preparation method of the organic nutrient-based dissolution accelerator for potassium sulfate.

The preparation method comprises the following steps:
A. Preparation of the Organic Acid Mixture Solution 20 parts by weight of glacial acetic acid, 2-5 parts by weight of salicylic acid and 1-3 parts by weight of ethylenediaminetetraacetic acid are added to 72-77 parts by weight of wood vinegar or bamboo vinegar, homogeneously mixed, and then heated to a temperature of 50-80° C., at which temperature the mixture is stirred until these organic acids are completely dissolved, and then cooled to obtain the organic acid mixture solution;

B. Preparation of the Organic Nutrient-Based Dissolution Accelerator for Potassium Sulfate 20-40 parts by weight of the organic acid mixture solution obtained in step A, 1-5 parts by weight of tyrosine, 1-5 parts by weight of leucine, 1-5 parts by weight of threonine and 2-5 parts by weight of glycerol are added to 20-70 parts by weight of water, and dissolved by stirring; then, 5-20 parts by weight of the alcohol amine are added, dissolved by stirring, and cooled to obtain the organic nutrient-based dissolution accelerator for potassium sulfate.

The raw materials for the preparation of the organic acid mixture solution and the organic nutrient-based dissolution accelerator for potassium sulfate have been described above and will not be repeated here.

The present invention also relates to the use of the stated organic nutrient-based dissolution accelerator for potassium sulfate or the organic nutrient-based dissolution accelerator for potassium sulfate prepared by the above method in dissolving potassium sulfate with water.

In the present invention, the steps of dissolving potassium sulfate with water are as follows:

Firstly, the water temperature is adjusted to 5-25° C.; then the above-mentioned organic nutrient-based dissolution accelerator for potassium sulfate or the organic nutrient-based dissolution accelerator for potassium sulfate prepared by the above described method is added to the water, followed by the addition of potassium sulfate, wherein the weight ratio of potassium sulfate to water is (0.5-1.2):10.0, and the weight ratio of the organic nutrient-based dissolution accelerator for potassium sulfate to potassium sulfate is (0.05-1.0):1; the mixture is homogeneously mixed by stirring, which allows potassium sulfate to be completely dissolved in water within 0.5-10.0 min.

In the present invention, the main purpose of adjusting the water temperature to 5-25° C. is to conform to the temperature in actual applications.

The weight ratio of potassium sulfate to water is constrained within (0.5-1.2):10.0, because potassium sulfate is dissolved with a relatively high concentration before entering the irrigation system as a water-soluble fertilizer. When the ratio is lower than 0.5:10, the potassium sulfate concentration will be too low when irrigation; when it is higher than 1.2:10 to exceed the saturation solubility of potassium sulfate, precipitation occurs.

The weight ratio of the organic nutrient-based dissolution accelerator for potassium sulfate to potassium sulfate is constrained within (0.05-1.0):1. When the ratio is lower than 0.05:1, the dissolution rate is relatively slow; when it is higher than 1:1, the application of potassium sulfate as the main fertilizer is affected.

Preferably, the particle size of potassium sulfate is 60-150 meshes. The stirring speed is 80-200 rpm.

Beneficial Effects

The beneficial effect of the present invention is that the organic nutrient-based dissolution accelerator for potassium sulfate can be widely used in the production of potassium sulfate type compound fertilizers, organic-inorganic compound fertilizers and water-soluble fertilizers, and can also be used in the production of conventional potassium sulfate type fertilizers. The organic nutrient-based dissolution accelerator for potassium sulfate of the present invention not only significantly increases the dissolution rate of potassium sulfate, which is 6-120 times higher than the existing water-soluble potassium sulfate, but also has the function of providing crops with organic nutrition and achieves a synergy with inorganic nutrition to further improve the nutritional efficiency of potassium and sulfur elements.

DESCRIPTION OF SPECIFIC EMBODIMENTS

The present invention can be better understood through the following examples.

I. PREPARATION EXAMPLES

Example 1: Preparation of the Organic Nutrient-Based Dissolution Accelerator for Potassium Sulfate of the Present Invention The steps for conducting this example are as follows:
A. Preparation of the Organic Acid Mixture Solution 20 parts by weight of glacial acetic acid, 2.8 parts by weight of salicylic acid and 1 part by weight of ethylenediaminetetraacetic acid are added to 72 parts by weight of wood vinegar, a product sold by Dongying Runyi Biotechnology Co., Ltd., homogeneously mixed, and then heated to a temperature of 70° C., at which temperature the mixture is stirred until these organic acids are completely dissolved, and then cooled to obtain the organic acid mixture solution.

B. Preparation of the Organic Nutrient-Based Dissolution Accelerator for Potassium Sulfate 20 parts by weight of the organic acid mixture solution obtained in step A, 1.8 parts by weight of tyrosine, 1 part by weight of leucine, 1 part by weight of threonine and 4.5 parts by weight of glycerol are added to 35 parts by weight of water, and dissolved by stirring; then, 20 parts by weight of N-methyldiethanolamine are added, dissolved by stirring, and cooled to obtain the organic nutrient-based dissolution accelerator for potassium sulfate.

Example 2: Preparation of the Organic Nutrient-Based Dissolution Accelerator for Potassium Sulfate of the Present Invention The steps for conducting this example are as follows:

A. Preparation of the Organic Acid Mixture Solution 20 parts by weight of glacial acetic acid, 4.2 parts by weight of salicylic acid and 3 parts by weight of ethylenediaminetetraacetic acid are added to 74 parts by weight of bamboo vinegar sold by Zhengzhou Yinong Biotechnology Co., Ltd., homogeneously mixed, and then heated to a temperature of 50° C., at which temperature the mixture is stirred until these organic acids are completely dissolved, and then cooled to obtain the organic acid mixture solution.

B. Preparation of the Organic Nutrient-Based Dissolution Accelerator for Potassium Sulfate 26 parts by weight of the organic acid mixture solution obtained in step A, 4.2 parts by weight of tyrosine, 5 parts by weight of leucine, 1.8 parts by weight of threonine and 2 parts by weight of glycerol are added to 55 parts by weight of water, and dissolved by stirring; then, 5 parts by weight of monoethanolamine are added, dissolved by stirring, and cooled to obtain the organic nutrient-based dissolution accelerator for potassium sulfate.

Example 3: Preparation of the Organic Nutrient-Based Dissolution Accelerator for Potassium Sulfate of the Present Invention The steps for conducting this example are as follows:

A. Preparation of the Organic Acid Mixture Solution 20 parts by weight of glacial acetic acid, 2 parts by weight of salicylic acid and 1.6 parts by weight of ethylenediaminetetraacetic acid are added to 75 parts by weight of wood vinegar, sold by Jinan Kunhong Biological Company, homogeneously mixed, and then heated to a temperature of 60° C., at which temperature the mixture is stirred until these organic acids are completely dissolved, and then cooled to obtain the organic acid mixture solution.

B. Preparation of the Organic Nutrient-Based Dissolution Accelerator for Potassium Sulfate 34 parts by weight of the organic acid mixture solution obtained in step A, 1 part by weight of tyrosine, 1.8 parts by weight of leucine, 4.2 parts by weight of threonine and 2.5 parts by weight of glycerol are added to 20 parts by weight of water, and dissolved by stirring; then, 8 parts by weight of triethanolamine are added, dissolved by stirring, and cooled to obtain the organic nutrient-based dissolution accelerator for potassium sulfate.

Example 4: Preparation of the Organic Nutrient-Based Dissolution Accelerator for Potassium Sulfate of the Present Invention The steps for conducting this example are as follows:

A. Preparation of the Organic Acid Mixture Solution 20 parts by weight of glacial acetic acid, 5 parts by weight of salicylic acid and 2.4 parts by weight of ethylenediaminetetraacetic acid are added to 77 parts by weight of bamboo vinegar, sold by Yifeng County Fangsheng Bamboo Industry Co., Ltd., homogeneously mixed, and then heated to a temperature of 80° C., at which temperature the mixture is stirred until these organic acids are completely dissolved, and then cooled to obtain the organic acid mixture solution.

B. Preparation of the Organic Nutrient-Based Dissolution Accelerator for Potassium Sulfate 40 parts by weight of the organic acid mixture solution obtained in step A, 5 parts by weight of tyrosine, 4.2 parts by weight of leucine, 5 parts by weight of threonine and 5 parts by weight of glycerol are added to 70 parts by weight of water, and dissolved by stirring; then, 16 parts by weight of diethanolamine are added, dissolved by stirring, and cooled to obtain the organic nutrient-based dissolution accelerator for potassium sulfate.

II. EXPERIMENTAL EXAMPLES

Experimental Example 1: Application Effect of the Potassium Sulfate Dissolution Accelerators of the Present Invention The potassium sulfate dissolution accelerators prepared in Example 2 and in Example 3 are used and marked with Dissolution Accelerator A and Dissolution Accelerator B, respectively. The dissolution accelerator without the addition of potassium sulfate is marked with CK as the control.

Firstly, the water temperature is adjusted to 25° C., and then the organic nutrient-based dissolution accelerator for potassium sulfate is added to the water, followed by the addition of potassium sulfate with a particle size of 100 meshes, which is homogeneously mixed by stirring at a stirring speed of 80 rpm; the time when potassium sulfate is completely dissolved is recorded; wherein the weight ratio of potassium sulfate to water is 0.8:10.0, and the weight ratio of the potassium sulfate dissolution accelerator to potassium sulfate is 0.5:1.

The experimental results are listed in Table 1.

TABLE 1

The Effect of Potassium Sulfate Dissolution Accelerator

| | Dissolution time, min | | |
|---|---|---|---|
| Treatment | Repeat 1 | Repeat 2 | Repeat 3 |
| CK | 44 | 38 | 40 |
| Dissolution Accelerator A | 0.8 | 0.6 | 0.5 |
| Dissolution Accelerator B | 1.3 | 1.2 | 1.0 |

The experimental results in Table 1 show that the potassium sulfate dissolution accelerators of the present invention significantly promote the dissolution of potassium sulfate, and that Dissolution Accelerators A and Dissolution Accelerators B respectively increase the dissolution speeds of potassium sulfate by 64 times and 35 times than that with CK, which greatly improves the dissolution rate of potassium sulfate.

Experimental Example 2: Application Effect of the Potassium Sulfate Dissolution Accelerators of the Present Invention The potassium sulfate dissolution accelerators prepared in Example 1 and in Example 4 are used and marked with Dissolution Accelerator C and Dissolution Accelerator D, respectively. The dissolution accelerator without the addition of potassium sulfate is marked with CK as the control.

Firstly, the water temperature is adjusted to 5° C., and then the organic nutrient-based dissolution accelerator for potassium sulfate is added to the water, followed by the addition of potassium sulfate with a particle size of 60 meshes, which is homogeneously mixed by stirring at a stirring speed of 100 rpm; the time when potassium sulfate is completely dissolved is recorded; wherein the weight ratio of potassium sulfate to water is 1.2:10.0, and the weight ratio of the potassium sulfate dissolution accelerator to potassium sulfate is 1.0:1.

The experimental results are listed in Table 2.

TABLE 2

The Effect of Potassium Sulfate Dissolution Accelerator

| Treatment | Dissolution time, min | | |
|---|---|---|---|
| | Repeat 4 | Repeat 5 | Repeat 6 |
| CK | 57 | 50 | 54 |
| Dissolution Accelerator C | 1.3 | 1.1 | 1.1 |
| Dissolution Accelerator D | 1.0 | 0.9 | 1.0 |

The experimental results in Table 2 show that the potassium sulfate dissolution accelerators of the present invention significantly promote the dissolution of potassium sulfate, and that Dissolution Accelerator C and Dissolution Accelerator D respectively increase the dissolution speeds of potassium sulfate by 46 times and 55 times than that of CK, which greatly improves the dissolution rate of potassium sulfate.

Experimental Example 3: Application Effect of the Potassium Sulfate Dissolution Accelerators of the Present Invention The potassium sulfate dissolution accelerators prepared in Example 1 and in Example 3 are used and marked with Dissolution Accelerator C and Dissolution Accelerator A, respectively. The dissolution accelerator without the addition of potassium sulfate is marked with CK as the control.

Firstly, the water temperature is adjusted to 12° C., and then the organic nutrient-based dissolution accelerator for potassium sulfate is added to the water, followed by the addition of potassium sulfate with a particle size of 150 meshes, which is homogeneously mixed by stirring at a stirring speed of 200 rpm; the time when potassium sulfate is completely dissolved is recorded; wherein the weight ratio of potassium sulfate to water is 0.5:10.0, and the weight ratio of the potassium sulfate dissolution accelerator to potassium sulfate is 0.05:1.

The experimental results are listed in Table 3.

TABLE 3

The Effect of Potassium Sulfate Dissolution Accelerator

| Treatment | Dissolution time, min | | |
|---|---|---|---|
| | Repeat 1 | Repeat 2 | Repeat 3 |
| CK | 40 | 36 | 39 |
| Dissolution Accelerator C | 0.6 | 0.5 | 0.6 |
| Dissolution Accelerator A | 0.6 | 0.5 | 0.5 |

The experimental results in Table 3 show that the potassium sulfate dissolution accelerators of the present invention remarkably promote the dissolution of potassium sulfate, and that Dissolution Accelerator A and Dissolution Accelerator C respectively increased dissolution speeds of potassium sulfate by 68 times and 72 times than that of CK, which greatly improves the dissolution rate of potassium sulfate. Therefore, the potassium sulfate dissolution accelerators of the present invention can significantly increase the dissolution rate of potassium sulfate, and can be widely used in the production of potassium sulfate type compound fertilizers, organic-inorganic compound fertilizers and water-soluble fertilizers. It can also be used in the application of conventional potassium sulfate type fertilizers.

The invention claimed is:

1. An organic nutrient-based dissolution accelerator for potassium sulfate, characterized in that the organic nutrient-based dissolution accelerator for potassium sulfate has the following composition in parts by weight:
   tyrosine 1-5 parts;
   leucine 1-5 parts;
   threonine 1-5 parts;
   glycerol 2-5 parts;
   alcohol amine 5-20 parts;
   water 20-70 parts;
   organic acid mixture solution 20-40 parts by weight.

2. The organic nutrient-based dissolution accelerator for potassium sulfate according to claim 1, characterized in that the organic nutrient-based dissolution accelerator for potassium sulfate has the following composition in parts by weight:
   tyrosine 1.8-4.2 parts;
   leucine 1.8-4.2 parts;
   threonine 1.8-4.2 parts;
   glycerol 2.5-4.5 parts;
   alcohol amine 8-16 parts solution;
   water 35-55 parts;
   organic acid mixture 26-34 parts by weight.

3. The organic nutrient-based dissolution accelerator for potassium sulfate according to claim 1, characterized in that the alcohol amine is one or more selected from monoethanolamine, diethanolamine, triethanolamine and N-methyldiethanolamine.

4. The organic nutrient-based dissolution accelerator for potassium sulfate according to claim 1, characterized in that the organic acid mixture solution consists of 20 parts by weight of glacial acetic acid, 2-5 parts by weight of salicylic acid, 1-3 parts by weight of of ethylenediaminetetraacetic acid and 72-77 parts by weight of wood vinegar or bamboo vinegar.

5. The organic nutrient-based dissolution accelerator for potassium sulfate according to claim 1, characterized in that the organic acid mixture solution consists of 20 parts by weight of glacial acetic acid, 2.8-4.2 parts by weight of salicylic acid, 1.6-2.4 parts by weight of ethylenediaminetetraacetic acid and 74-75 parts by weight of wood vinegar or bamboo vinegar.

6. A preparation method of the organic nutrient-based dissolution accelerator for potassium sulfate according to claim 1, characterized in that the preparation method comprises the following steps:
   A) Preparation of the organic acid mixture solution
      20 parts by weight of glacial acetic acid, 2-5 parts by weight of salicylic acid and 1-3 parts by weight of ethylenediaminetetraacetic acid are added to 72-77 parts by weight of wood vinegar or bamboo vinegar, homogeneously mixed, and then heated to a temperature of 50-80° C., at which temperature the mixture is stirred until these organic acids are completely dissolved, and then cooled to obtain the organic acid mixture solution;
   B) Preparation of the organic nutrient-based dissolution accelerator for potassium sulfate
      20-40 parts by weight of the organic acid mixture solution obtained in step A, 1-5 parts by weight of tyrosine, 1-5 parts by weight of leucine, 1-5 parts by weight of threonine and 2-5 parts by weight of glycerol are added to 20-70 parts by weight of water, and dissolved by stirring; then, 5-20 parts by weight of the alcohol amine are added, dissolved by stirring, and cooled to obtain the organic nutrient-based dissolution accelerator for potassium sulfate.

7. A process for dissolving potassium sulfate with water, the process comprising the step of contacting potassium sulfate, water, and the organic nutrient-based dissolution accelerator for potassium sulfate according to claim 1 to dissolve the potassium sulfate.

8. The process according to claim 7, characterized in that the steps of dissolving potassium sulfate with water are as follows:
   firstly, the water temperature is adjusted to 5-25° C.; then a first organic nutrient-based dissolution accelerator for potassium sulfate or a second organic nutrient-based dissolution accelerator for potassium sulfate obtained by a preparation method is added to the water, followed by the addition of potassium sulfate, wherein the weight ratio of potassium sulfate to water is (0.5-1.2): 10.0, and the weight ratio of the organic nutrient-based dissolution accelerator for potassium sulfate to potassium sulfate is (0.05-1.0):1; the mixture is homogeneously mixed by stirring, which allows potassium sulfate to be completely dissolved in water within 0.5-10.0 min,
   wherein the first organic nutrient-based dissolution accelerator has the following composition in parts by weight:
   tyrosine 1-5 parts;
   leucine 1-5 parts;
   threonine 1-5 parts;
   glycerol 2-5 parts;
   alcohol amine 5-20 parts;
   water 20-70 parts;
   organic acid mixture solution; and
   20-40 parts by weight, and
   wherein the preparation method comprises the following steps:
   A) Preparation of the organic acid mixture solution
      20 parts by weight of glacial acetic acid, 2-5 parts by weight of salicylic acid and 1-3 parts by weight of ethylenediaminetetraacetic acid are added to 72-77 parts by weight of wood vinegar or bamboo vinegar, homogeneously mixed, and then heated to a temperature of 50-80° C., at which temperature the mixture is stirred until these organic acids are completely dissolved, and then cooled to obtain the organic acid mixture solution;
   B) Preparation of the organic nutrient-based dissolution accelerator for potassium sulfate
      20-40 parts by weight of the organic acid mixture solution obtained in step A, 1-5 parts by weight of tyrosine, 1-5 parts by weight of leucine, 1-5 parts by weight of threonine and 2-5 parts by weight of glycerol are added to 20-70 parts by weight of water, and dissolved by stirring; then, 5-20 parts by weight of the alcohol amine are added, dissolved by stirring, and cooled to obtain the organic nutrient-based dissolution accelerator for potassium sulfate.

9. The use according to claim 8, characterized in that the particle size of potassium sulfate is 60-150 meshes.

10. The use according to claim 8, characterized in that the stirring speed is 80-200 rpm.

11. The organic nutrient-based dissolution accelerator for potassium sulfate according to claim 2, characterized in that the alcohol amine is one or more selected from monoethanolamine, diethanolamine, triethanolamine, and N-methyldiethanolamine.

12. The organic nutrient-based dissolution accelerator for potassium sulfate according to claim 2, characterized in that the organic acid mixture solution consists of 20 parts by weight of glacial acetic acid, 2-5 parts by weight of salicylic acid, 1-3 parts by weight of ethylenediaminetetraacetic acid and 72-77 parts by weight of wood vinegar or bamboo vinegar.

13. The organic nutrient-based dissolution accelerator for potassium sulfate according to claim 2, characterized in that the organic acid mixture solution consists of 20 parts by weight of glacial acetic acid, 2.8-4.2 parts by weight of salicylic acid, 1.6-2.4 parts by weight of ethylenediaminetetraacetic acid and 74-75 parts by weight of wood vinegar or bamboo vinegar.

14. A process for dissolving potassium sulfate with water, the process comprising the step of contacting potassium sulfate, water, and the organic nutrient-based dissolution accelerator for potassium sulfate obtained by the preparation method according to claim 6 to dissolve the potassium sulfate.

15. The use according to claim 14, characterized in that the steps of dissolving potassium sulfate with water are as follows:
   firstly, the water temperature is adjusted to 5-25° C.; then a first organic nutrient-based dissolution accelerator for potassium sulfate or a second organic nutrient-based dissolution accelerator for potassium sulfate obtained by a preparation method is added to the water, followed by the addition of potassium sulfate, wherein the weight ratio of potassium sulfate to water is (0.5-1.2): 10.0, and the weight ratio of the organic nutrient-based dissolution accelerator for potassium sulfate to potassium sulfate is (0.05-1.0):1; the mixture is homogeneously mixed by stirring, which allows potassium sulfate to be completely dissolved in water within 0.5-10.0 min, wherein the first organic nutrient-based dissolution accelerator has the following composition in parts by weight:
tyrosine 1-5 parts;
leucine 1-5 parts;
threonine 1-5 parts;
glycerol 2-5 parts;
alcohol amine 5-20 parts;
water 20-70 parts;
organic acid mixture solution; and
20-40 parts by weight, and
wherein the preparation method comprises the following steps:

A) Preparation of the organic acid mixture solution
20 parts by weight of glacial acetic acid, 2-5 parts by weight of salicylic acid and 1-3 parts by weight of ethylenediaminetetraacetic acid are added to 72-77 parts by weight of wood vinegar or bamboo vinegar, homogeneously mixed, and then heated to a temperature of 50-80° C., at which temperature the mixture is stirred until these organic acids are completely dissolved, and then cooled to obtain the organic acid mixture solution;

B) Preparation of the organic nutrient-based dissolution accelerator for potassium sulfate
20-40 parts by weight of the organic acid mixture solution obtained in step A, 1-5 parts by weight of tyrosine, 1-5 parts by weight of leucine, 1-5 parts by weight of threonine and 2-5 parts by weight of glycerol are added to 20-70 parts by weight of water, and dissolved by stirring; then, 5-20 parts by weight of the alcohol amine are added, dissolved by stirring, and cooled to obtain the organic nutrient-based dissolution accelerator for potassium sulfate.

16. The use according to claim 14, characterized in that the particle size of potassium sulfate is 60-150 meshes.

17. The use according to claim 14, characterized in that the stirring speed is 80-200 rpm.

* * * * *